(12) United States Patent
Nakamoto et al.

(10) Patent No.: US 10,297,831 B2
(45) Date of Patent: May 21, 2019

(54) ANODE LAYER FOR FLUORIDE ION BATTERY AND FLUORIDE ION BATTERY

(71) Applicants: TOYOTA JIDOSHA KABUSHIKI KAISHA, Toyota-shi, Aichi-ken (JP); HONDA MOTOR CO., LTD., Tokyo-to (JP); KYOTO UNIVERSITY, Kyoto-shi, Kyoto-fu (JP)

(72) Inventors: Hirofumi Nakamoto, Kyoto (JP); Masao Ichikawa, Wako (JP); Zempachi Ogumi, Kyoto (JP); Takeshi Abe, Kyoto (JP)

(73) Assignees: TOYOTA JIDOSHA KABUSHIKI KAISHA, Toyota-shi, Aichi-ken (JP); HONDA MOTOR CO., LTD., Tokyo-to (JP); KYOTO UNIVERSITY, Kyoto-shi, Kyoto-fu (JP)

( * ) Notice: Subject to any disclaimer, the term of this patent is extended or adjusted under 35 U.S.C. 154(b) by 0 days.

(21) Appl. No.: 15/609,129

(22) Filed: May 31, 2017

(65) Prior Publication Data
US 2017/0352887 A1    Dec. 7, 2017

(30) Foreign Application Priority Data
Jun. 2, 2016    (JP) .................................. 2016-111053

(51) Int. Cl.
| | | |
|---|---|---|
| *H01M 4/62* | (2006.01) | |
| *H01M 4/38* | (2006.01) | |
| *H01M 10/36* | (2010.01) | |

(52) U.S. Cl.
CPC ............. *H01M 4/622* (2013.01); *H01M 4/38* (2013.01); *H01M 10/36* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 7,972,725 B2 * | 7/2011 | Krause ................. | C08G 73/106 252/182.1 |
| 2010/0021800 A1 | 1/2010 | Yazami et al. | |
| 2016/0087308 A1 * | 3/2016 | Nakamoto ........ | H01M 10/0567 429/341 |

* cited by examiner

*Primary Examiner* — Sarah A. Slifka
(74) *Attorney, Agent, or Firm* — Sughrue Mion, PLLC

(57) ABSTRACT

An object of the present disclosure is to provide an anode layer for a fluoride ion battery in which decomposition of a binder is restrained. The present disclosure attains the object by providing an anode layer to be used for a fluoride ion battery, the anode layer comprising an anode active material and a non-fluorine-based binder having aromaticity.

9 Claims, 4 Drawing Sheets

ANODE LAYER FOR FLUORIDE ION BATTERY AND FLUORIDE ION BATTERY

TECHNICAL FIELD

The present disclosure relates to an anode layer for a fluoride ion battery in which decomposition of a binder is restrained.

BACKGROUND ART

Li ion batteries have been known as a battery with a high voltage and high energy density for example. The Li ion battery is a cation based battery utilizing the reaction of Li ions with cathode active materials, and the reaction of Li ions with anode active materials. On the other hand, fluoride ion batteries have been known as an anion based battery that utilizes the reaction of fluoride ions.

For example, Patent Literature 1 discloses an electrode utilizing fluoride ions, the electrode containing carbon nanomaterials, a metal-based material, and a polymeric binder. Further, in Examples of Patent Literature 1, polyvinylidene fluoride (PVDF) is used as the polymeric binder.

CITATION LIST

Patent Literature

Patent Literature 1: US Patent Application Publication US 2010/0021800

SUMMARY OF DISCLOSURE

Technical Problem

In a fluoride ion battery, fluoride ions directly contribute to a reaction with anode active materials. If a fluorine-based binder such as PVDF is used therein, the anode active material affects the fluorine contained in the fluorine-based binder and easily brings decomposition of the binder (reductive decomposition).

The present disclosure has been made in view of the above circumstances, and an object thereof is to provide an anode layer (an anode layer for a fluoride ion battery) in which decomposition of a binder is restrained.

Solution to Problem

To achieve the above object, the present disclosure provides an anode layer to be used for a fluoride ion battery, the anode layer comprising an anode active material and a non-fluorine-based binder having aromaticity.

According to the present disclosure, using the non-fluorine-based binder having aromaticity allows the anode layer in which decomposition of the binder is restrained.

In the disclosure, the non-fluorine-based binder is preferably a polyimide resin.

Also, the present disclosure provides a fluoride ion battery comprising a cathode layer, an anode layer, and an electrolyte layer formed between the cathode layer and the anode layer, wherein the anode layer is the above described anode layer.

According to the present disclosure, using the above described anode layer allows a fluoride ion battery to have favorable durability.

Advantageous Effects of Disclosure

The anode layer for a fluoride ion battery of the present disclosure exhibits effects such that decomposition of a binder is restrained.

DESCRIPTION OF EMBODIMENTS

Figure 1:
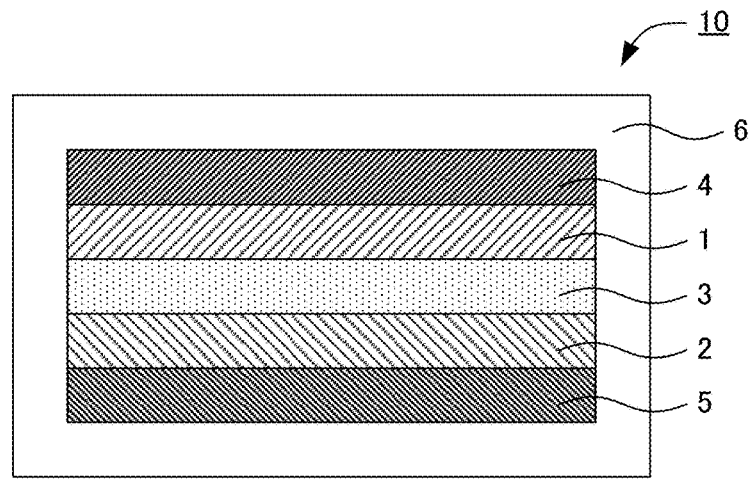
FIG. 1 is a schematic cross sectional view illustrating an example of the fluoride ion battery of the present disclosure.

The anode layer for a fluoride ion battery and the fluoride ion battery of the present disclosure are hereinafter described in details.

A. Anode Layer for Fluoride Ion Battery

The anode layer for a fluoride ion battery of the present disclosure comprises an anode active material and a non-fluorine-based binder having aromaticity.

According to the present disclosure, using the non-fluorine-based binder having aromaticity allows the anode layer in which decomposition of the binder is restrained. If a fluorine-based binder such as PVDF is used herein, a reductive decomposition of the binder may proceed along with the usage of the fluoride ion battery, to possibly cause a capacity decrease and a deterioration of the cycle property due to the adhesion decrease of the anode active material to the anode current collector. For example, lithium ion batteries utilizing a carbon material as the anode active material have been generally known; in that case, usage of the fluorine-based binder for the anode layer does not cause a big problem. The reason therefor is that Li ions (cations) react with the anode active material prior to the reductive decomposition of the binder.

In contrast, in fluoride ion batteries, the fluoride ions directly contribute to the reaction with the anode active material, so that not only the fluoride ions in the electrolyte material but also the fluorine included in the fluorine-based binder are used for the reaction to promote the reductive decomposition of the binder. In the present disclosure, the reductive decomposition of the binder may be restrained since the binder not containing fluorine is used. Further, the non-fluorine-based binder having aromaticity allows high stability to fluoride ions. In these manners, the capacity decrease and the deterioration of the cycle property due to the adhesion decrease may be restrained.

The anode layer for a fluoride ion battery of the present disclosure is hereinafter described in each constitution.

1. Anode Active Material

Examples of the anode active material in the present disclosure may include a simple substance of metal, an alloy, a metal oxide, and fluorides thereof. Examples of the metal element to be contained in the anode active material may include La, Ca, Al, Eu, Li, Si, Ge, Sn, In, V, Cd, Cr, Fe, Zn, Ga, Ti, Nb, Mn, Yb, Zr, Sm, Ce, Mg, and Pb. Above all, the anode active material is preferably Mg, $MgF_x$, Al, $AlF_x$, Ce, $CeF_x$, Ca, $CaF_x$, Pb, and $PbF_x$. Incidentally, the "x" is a real number larger than 0. Also, other examples of the anode active material may include carbon materials and fluorides thereof. Examples of the carbon material may include graphite, coke, and carbon nanotube. Also, additional examples of the anode active material may include polymeric materials. Examples of the polymeric material may include polyaniline, polypyrrole, polyacetylene, and polythiophene.

Examples of the shape of the anode active material may include a granular shape. The average particle diameter ($D_{50}$) of the anode active material is, for example, in a range of 0.1 μm to 50 μm, and may be in a range of 1 μm to 20 μm. Also, the content of the anode active material in the anode layer is preferably larger from the viewpoint of the capacity. The content of the anode active material is, for example, 50 volume % or more and preferably 70 volume % or more.

2. Non-Fluorine-Based Binder

The non-fluorine-based binder in the present disclosure has aromaticity. Here, "non-fluorine-based" refers to the binder that does not contain fluorine as the constituent of the binder. Incidentally, if the binder not containing fluorine is exposed to fluoride ions in the battery, the fluoride ions may possibly be adsorbed to apart of the binder (fluorinated). The fluoride ions adsorbed this way do not fall under the constituent of the binder. Also, the binder may be a non-halogen-based binder that does not contain halogen as the constituent of the binder. Also, "having aromaticity" refers to having a conjugated unsaturated ring structure (an aromatic structure). Examples of the aromatic structure may include an aromatic hydrocarbon structure comprising only hydrocarbon, and a heteroaromatic structure in which an element other than carbon is included in the cyclic structure. Examples of the element other than carbon may include nitrogen.

Examples of the non-fluorine-based binder may include a polyimide resin, a polyphenylene sulfide resin, and a polyphenylene ether resin.

Examples of the polyimide resin may include a resin represented by the following general formula (1). In the formula, R and R' are each independently an arbitrary atomic group; however, at least one of R and R' has aromaticity, and preferably both R and R' have aromaticity. Such a polyimide resin has high stability to fluoride ions. Incidentally, "n" is an arbitrary positive number.

[Chemical Formula 1]

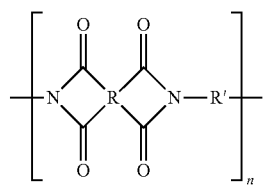

General formula (1)

The polyimide resin may be obtained by heat treating a precursor (a polyamic acid) for example. Examples of the precursor of the polyimide resin may include a polyamic acid synthesized from a composition containing a tetracarboxylic dianhydride and a diamine. A typical example of the method for synthesizing the polyimide resin may be conducting a heat treatment to imidize a polyamic acid, in which a pyromellitic dianhydride and 4,4'-diaminodiphenylether are polymerized, as shown in the following reaction formula.

[Chemical Formula 2]

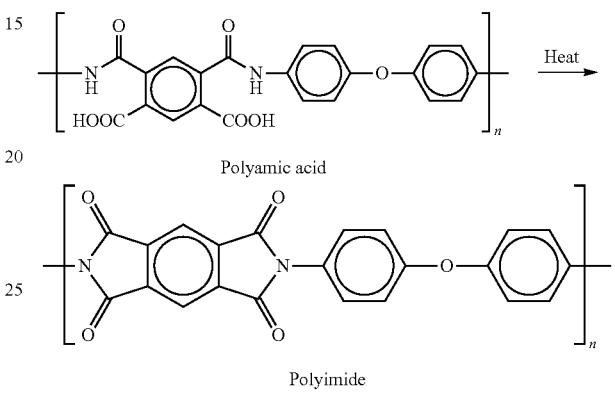

Polyamic acid

Polyimide

Examples of the tetracarboxylic dianhydride may include: an alicyclic tetracarboxylic anhydride (such as a cyclohexanetetracarboxylic dianhydride), and an aromatic tetracarboxylic dianhydride (such as: arenetetracarboxylic anhydrides such as pyromellitic dianhydride and naphthalenetetracarboxylic dianhydride; bisphenoltetracarboxylic dianhydrides such as biphenyltetracarboxylic dianhydrides, biphenylethertetracarboxylic dianhydrides such as 4,4'-oxydiphthalic anhydride (ODPA, 3,4,3',4'-diphenylethertetracarboxylic dianhydride), benzophenonetetracarboxylic dianhydrides, biphenylalkanetetracarboxylic dianhydrides, and biphenylsulfonetetracarboxylic dianhydrides; and biphenilethertetracarboxylic dianhydrides having a biphenylalkane skeleton such as 4,4'-(4,4'-isopropylidenediphenoxy)bis (phthalic anhydride) (BPADA, the anhydride of 2,2-bis[4-(3,4-dicarboxyphenoxy)phenyl]propane)).

Examples of the diamine may include an aliphatic diamine (such as: straight chain or branched chain alkylene diamines such as ethylenediamine, propylenediamine, 1,4-butylenediamine, hexamethylenediamine, and trimethylhexamethylenediamine; and polyetherdiamines), an alicyclic diamine (such as: bis(aminocyclohexyl)alkanes such as menthenediamine, isophoronediamine, hydrogen-added-xylenediamine, diaminodicyclohexylmethane, and bis(4-amino-3-methylcyclohexyl)methane), and an aromatic diamine [such as: phenylenediamines, xylenediamines, bis(aminophenyl)ethers such as 4,4'-diaminodiphenylether, bis(aminophenyl)ketones such as 4,4'-diaminodiphenylketone, bis(aminophenyl)sulfones such as 4,4'-diaminodiphenylsulfone, such as bis(aminophenyl)alkanes such as 1,1-bis(4-aminophenyl)methane, and bis(aminophenyl)benzenes such as 1,3-bis(2-aminophenyl)benzene. These acid anhydrides and diamines may respectively be used alone or in combination of the two kinds or more.

The weight average molecular weight of the polyimide resin is preferably in a range of 3,000 to 1,000,000 for example. The weight average molecular weight refers to a value calculated as polystyrene according to the gel permeation chromatography (GPC).

The content of the non-fluorine-based binder in the anode layer is preferably smaller from the viewpoint of the capacity. The content of the non-fluorine-based binder is 30 volume % or less for example, and preferably 15 volume % or less.

3. Anode Layer

The anode layer of the present disclosure may further contain a conductive material. The conductive material is not particularly limited if it has the desired electron conductivity, and examples thereof may include carbon materials. Examples of the carbon material may include carbon blacks such as acetylene black, Ketjen black, furnace black and thermal black. Also, the thickness of the anode layer is in a range of 0.1 μm to 1000 μm for example.

An example of the method for producing the anode layer is a method wherein slurry containing an anode active material and a binder precursor (such as polyamic acid) is used for a coating, and thereafter the coating is heat treated to obtain a binder (such as polyimide) from the binder precursor. Another example of the method for producing the anode layer is a method wherein slurry containing an anode active material and a binder is used for coating, and then dried.

B. Fluoride Ion Battery

FIG. 1 is a schematic cross sectional view illustrating an example of the fluoride ion battery of the present disclosure. Fluoride ion battery 10 shown in FIG. 1 comprises cathode layer 1, anode layer 2, electrolyte layer 3 formed between cathode layer 1 and anode layer 2, cathode current collector 4 for collecting currents of cathode layer 1, anode current collector 5 for collecting currents of anode layer 2, and battery case 6 for storing these members.

According to the present disclosure, usage of the above described anode layer allows a fluoride ion battery to have favorable durability.

The fluoride ion battery of the present disclosure is hereinafter described in each constitution.

1. Anode Layer

The anode layer in the present disclosure is in the same contents as the description in "A. Anode layer for fluoride ion battery" above; thus, the description herein is omitted.

2. Cathode Layer

The cathode layer in the present disclosure is a layer containing at least a cathode active material. Also, the cathode layer may further contain at least one of a conductive material and a binder other than the cathode active material.

Examples of the cathode active material in the present disclosure may include a simple substance of metal, an alloy, a metal oxide, and fluorides thereof. Examples of the metal element to be contained in the cathode active material may include Cu, Ag, Ni, Co, Pb, Ce, Mn, Au, Pt, Rh, V, Os, Ru, Fe, Cr, Bi, Nb, Sb, Ti, Sn, and Zn. Above all, the cathode active material is preferably Cu, $CuF_x$, Fe, $FeF_x$, Ag, and $AgF_x$. Incidentally, the "x" is a real number larger than 0. Also, the above described carbon materials and polymeric materials may be used as the cathode active material.

The same conductive materials described in "A. Anode layer for fluoride ion battery" above can be used as the conductive material. Examples of the binder may include fluorine-based binders such as polyvinylidene fluoride (PVDF) and polytetra fluoroethylene (PTFE). Also, the content of the cathode active material in the cathode layer is preferably larger from the viewpoint of the capacity. Also, the thickness of the cathode layer may greatly vary with the constitution of the battery, and thus is not particularly limited.

3. Electrolyte Layer

The electrolyte layer in the present disclosure is a layer to be formed between the cathode layer and the anode layer. The electrolyte material included in the electrolyte layer may be an electrolyte solution (liquid electrolyte) and may be a solid electrolyte material.

The liquid electrolyte contains a fluoride salt and an organic solvent for example. Examples of the fluoride salt may include inorganic fluoride salts and organic fluoride salts. An example of the inorganic fluoride salt is XF (X is Li, Na, K, Rb, or Cs). An example of the cation of the organic fluoride salt is alkylammonium cations such as tetramethylammonium cation. The concentration of the fluoride salt in the liquid electrolyte is in a range of 0.1 mol % to 40 mol % for example, and preferably in a range of 1 mol % to 10 mol %. Also, the liquid electrolyte may contain a fluoride complex salt such as $LiPF_6$.

Examples of the organic solvent for the liquid electrolyte may include glyme such as triethylene glycol dimethyl ether (G3) and tetraethylene glycol dimethyl ether (G4), cyclic carbonates such as ethylene carbonate (EC), fluoroethylene carbonate (FEC), difluoroethylene carbonate (DFEC), propylene carbonate (PC) and butylene carbonate (BC), and chain carbonates such as dimethyl carbonate (DMC), diethyl carbonate (DEC), and ethyl methyl carbonate (EMC). Also, an ionic solution may be used as the organic solvent.

Meanwhile, examples of the solid electrolyte material may include fluorides of lanthanoid elements such as La and Ce, fluorides of alkali elements such as Li, Na, K, Rb, and Cs, and fluorides of alkali earth elements such as Ca, Sr, and Ba. Specific examples thereof may include a fluoride of La and Ba (such as $La_{0.9}Ba_{0.1}F_{2.9}$), and a fluoride of Pb and Sn.

4. Other Constitutions

The fluoride ion battery of the present disclosure comprises at least the above described anode layer, cathode layer, and electrolyte layer, and usually further comprises a cathode current collector for collecting currents of the cathode layer, and an anode current collector for collecting currents of the anode layer. Examples of the shape of the current collectors may include a foil shape, a mesh shape, and a porous shape. Also, the fluoride ion battery of the present disclosure may comprise a separator between the cathode layer and the anode layer. The reason therefor is to obtain a battery with higher safety.

5. Fluoride Ion Battery

The fluoride ion battery of the present disclosure may be a primary battery and may be a secondary battery, but preferably is a secondary battery among them, so as to be repeatedly charged and discharged and useful as a car mounted battery for example. Also, examples of the shape of the fluoride ion battery may include a coin shape, a laminate shape, a cylindrical shape, and a square shape.

Incidentally, the present disclosure is not limited to the embodiments. The embodiments are exemplification, and other variations are intended to be included in the technical scope of the present disclosure if they have substantially the same constitution as the technical idea described in the claim of the present disclosure and offer similar operation and effect thereto.

EXAMPLES

The present disclosure is hereinafter described in more details with reference to Examples.

Example 1

Prepared were Fe (manufactured by JAPAN PURE CHEMICAL CO., LTD.) as an active material and a polyimide resin (PI, DREAMBOND, manufactured by Industrial Summit Technology) as a binder, which were mixed at the solid weight ratio of Fe:PI=9:2 and used for coating a Fe foil (manufactured by The Nilaco Corporation), then heated at 200° C. in vacuum for 10 hours. Thereby, an evaluation electrode was obtained.

Comparative Example 1

Prepared were Fe (manufactured by JAPAN PURE CHEMICAL CO., LTD.) as an active material and a polyvinylidene fluoride (PVdF, manufactured by Kureha Battery Materials Japan) as a binder, which were mixed at the solid weight ratio of Fe:PVdF=9:0.75 and used for coating a Fe foil (manufactured by The Nilaco Corporation), then heated at 120° C. in vacuum for 10 hours. Thereby, an evaluation electrode was obtained.

Comparative Example 2

Prepared were Al (manufactured by JAPAN PURE CHEMICAL CO., LTD.) as an active material and a polytetra fluoroethylene (PTFE, manufactured by Du Pont-Mitsui Fluorochemicals Co., Ltd.) as a binder, which were kneaded and formed at the solid weight ratio of Al:PTFE=19:1 and used for coating an Al foil (manufactured by The Nilaco Corporation), then heated at 120° C. in vacuum for 10 hours. Thereby, an evaluation electrode was obtained.

Reference Example 1

An Fe foil (manufactured by The Nilaco Corporation) was used as an evaluation electrode.

Reference Example 2

An Al foil (manufactured by The Nilaco Corporation) was used as an evaluation electrode.

Reference Example 3

A foamed Al (manufactured by Mitsubishi Materials Corporation) was used as an evaluation electrode.

[Evaluations]

(Cyclic Voltammetry Measurement)

A CV measurement was conducted for the evaluation electrodes obtained in Example 1, Comparative Examples 1 and 2, and Reference Examples 1 to 3. First, a liquid electrolyte was produced. In specific, triglyme (G3, manufactured by KANTO CHEMICAL CO., INC.), lithium hexafluorophosphate ($LiPF_6$, manufactured by Kishida Chemical Co., Ltd.), and lithium fluoride (LiF, manufactured by Wako Pure Chemical Industries, Ltd.) were weighed and mixed so as to be G3:$LiPF_6$:LiF=20:5:1 in the molar ratio, and then stirred at 30° C. in a sealed container made of fluororesin to obtain the liquid electrolyte.

Next, a dip-type 3-electrodes cell was produced in a glove box under an Ar atmosphere. The evaluation electrode was used as the working electrode, and a mixture electrode of PTFE, acetylene black (AB), and carbon fluoride was used as the counter electrode. Incidentally, the mixture electrode was an electrode that contains the materials in the weight ratio of PTFE:AB:carbon fluoride=1:2:7. Also, a reference electrode was separated from the liquid electrolyte by a Vycor glass. Incidentally, the reference electrode used was a Ag line soaked in an acetonitrile solution in which silver nitrate and tetrabutylammonium perchlorate were dissolved in the concentration of 0.1 M respectively. The measurement was conducted in the conditions of at a room temperature and sweeping speed of 1 mV/s. Incidentally, regarding the potentials described in later described FIG. 2 to FIG. 8C, dissolution and deposition of Li was conducted in the same liquid electrolyte beforehand, and the potentials according to the reaction potential (potential based on Li) were used.

Figure 2:
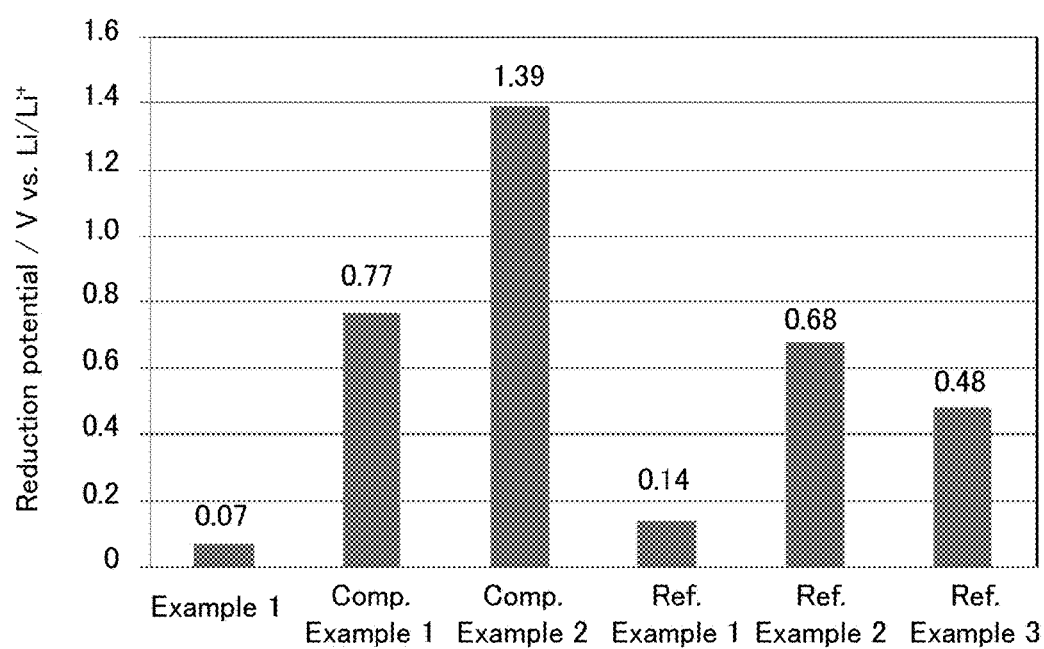
FIG. 2 is the result of a reduction potential measurement for the evaluation electrode obtained in Example 1, Comparative Examples 1 and 2, and Reference Examples 1 to 3.
Figure 3:
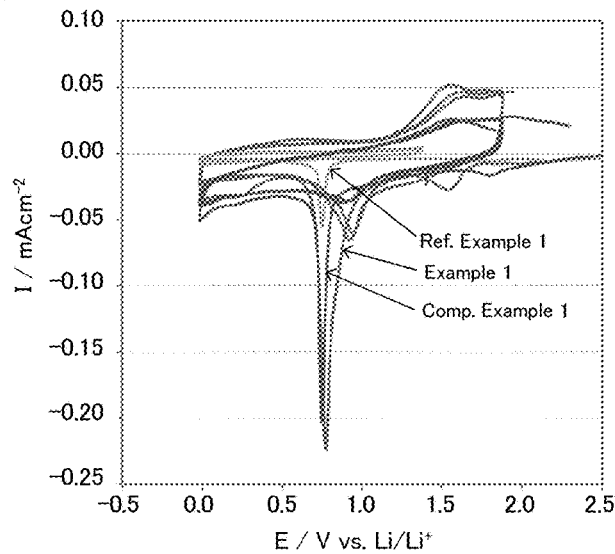
FIG. 3 is the result of a CV measurement for the evaluation electrode obtained in Example 1, Comparative Example 1, and Reference Example 1.
Figure 4A:
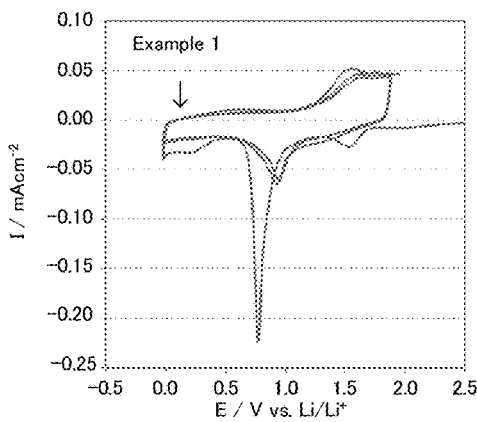
FIGS. 4A to 4C are the results of the CV measurement for the evaluation electrode obtained in Example 1, Comparative Example 1, and Reference Example 1.
Figure 4C:
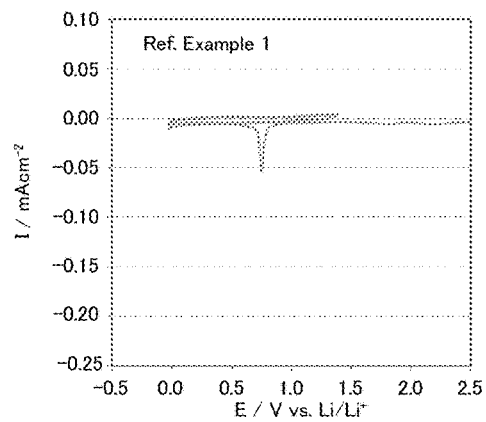
Figure 4B:
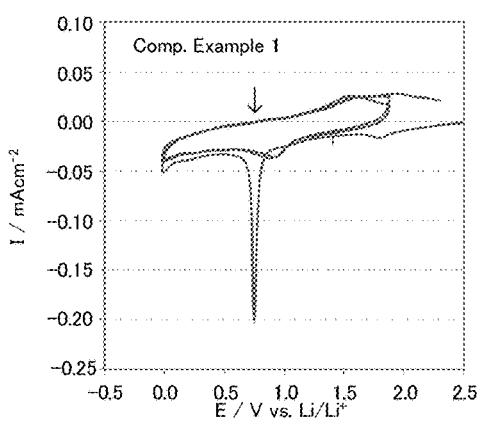
Figure 5:
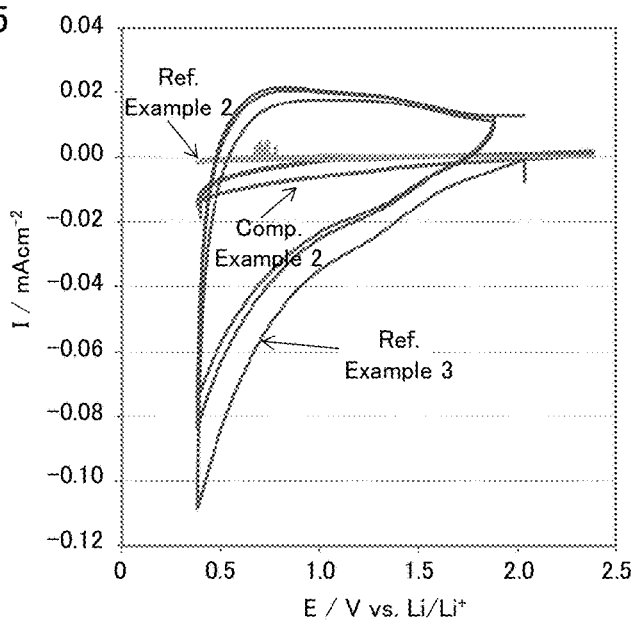
FIG. 5 is the result of a CV measurement for the evaluation electrode obtained in Comparative Example 2 and Reference Examples 2 and 3.
Figure 6A:
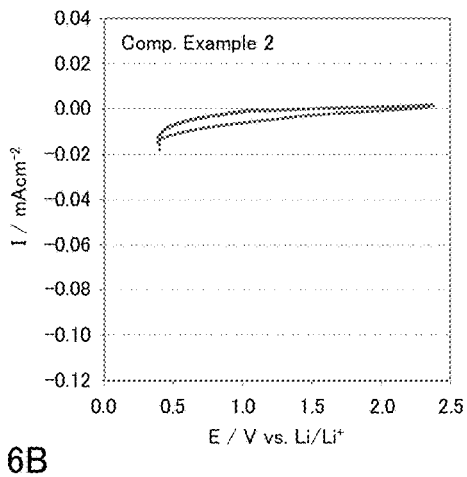
FIGS. 6A to 6C are the results of the CV measurement for the evaluation electrode obtained in Comparative Example 2 and Reference Examples 2 and 3.
Figure 6C:
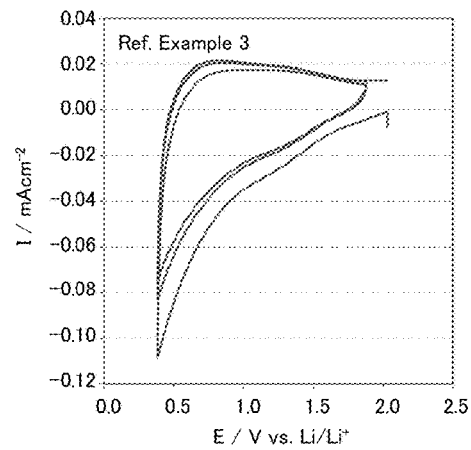
Figure 6B:
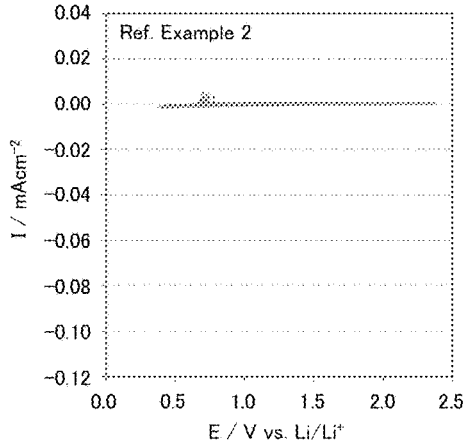
Figure 7:
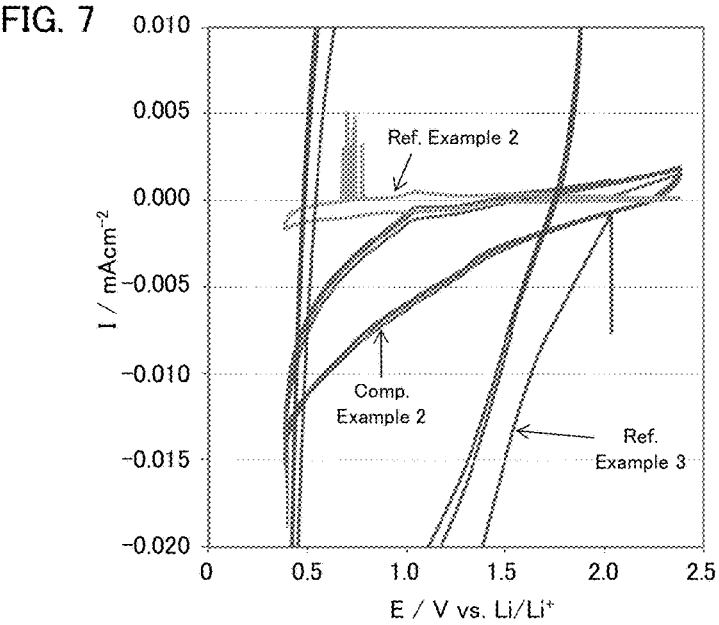
FIG. 7 is an enlarged view in which a part of FIG. 5 is enlarged.
Figure 8A:
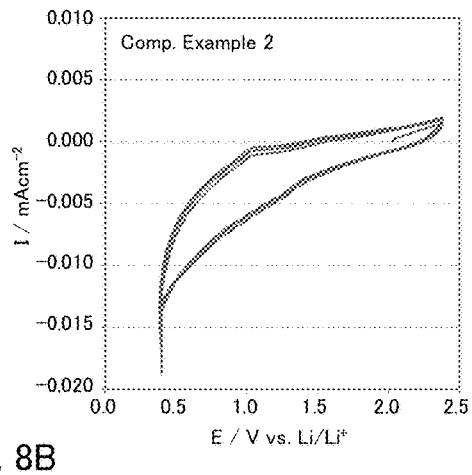
FIGS. 8A to 8C are enlarged views in which a part of FIGS. 6A to 6C are respectively enlarged.
Figure 8C:
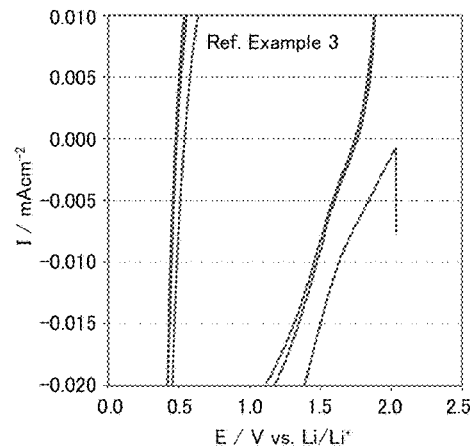
Figure 8B:
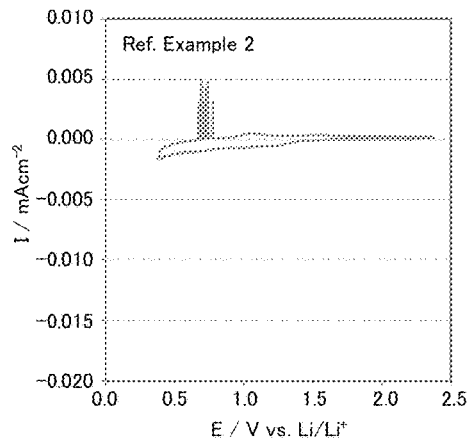

The result of the reduction potential is shown in FIG. 2. Incidentally, the reduction reaction potential was calculated by allowing the oxidation current at the time of the sweep to the higher potential side to be a confirmable potential. As shown in FIG. 2, the reduction potential was lower in Example 1, in which a non-fluorine-based binder was used, than that in Comparative Example 1, in which a fluorine-based binder was used; thus it was confirmed that reductive decomposition did not easily occur. Further, since the reduction potential in Example 1 was lower than that in Reference Example 1, it was confirmed that the reductive decomposition on the metal was inhibited. The reason why the reduction potential in Example 1 was lower than the reduction potential in Reference Example 1 was presumed to be that the molecule structure of the non-fluorine-based binder having aromaticity had flatness so that the binder was reasonably adhered to the surface of Fe. It was presumed that the flatness prevented excessive solvent from coming close to the Fe, so that the reduction potential in Example 1 became lower than the reduction potential in Reference Example 1, in which a binder was not used.

On the other hand, as shown in FIG. 2, the reduction potential was higher in Comparative Example 2, in which a fluorine-based binder was used, than those in Reference Examples 2 and 3, in which a binder was not used. Thus, it was confirmed that decomposition of the fluorine-based binder occurred when an Al electrode was used, similarly to when a Fe electrode was used. Thereby, it was suggested that the reductive decomposition of a binder did not occur easily when a non-fluorine-based binder having aromaticity was used for an Al electrode, similarly to the case of using a Fe electrode. Incidentally, the reason why the reduction potential in Comparative Example 2 (PTFE) was higher than the reduction potential in Comparative Example 1 (PVdF) was presumed to be that F elements contained in the PTFE were more than F elements contained in the PVdF, so as to be easily reduced.

FIG. 3 and FIGS. 4A to 4C are the results of CV measurements for the evaluation electrodes obtained in Example 1, Comparative Example 1, and Reference Example 1. As shown in FIG. 3 and FIGS. 4A to 4C, the reduction current peak was confirmed in the vicinity of 0.75V in all Example 1, Comparative Example 1, and Reference Example 1. This peak was considered to be a peak in accordance with the removal of the oxidized film on the Fe surface. Also, at the time of the sweep from the lower potential side to the higher potential side, the oxidation current was observed in lower potential in Example 1 than that in Comparative Example 1 (ref: arrow mark). As the result, it was suggested that the reduction stability was higher in Example 1 than that in Comparative Example 1.

FIG. 5 to FIG. 8C are the results of CV measurements for the evaluation electrodes obtained in Comparative Example 2, and Reference Examples 2 and 3. Incidentally, FIG. 7 and FIGS. 8A to 8C respectively correspond to enlarged views of FIG. 5 and FIGS. 6A to 6C. As shown in FIG. 5 to FIG. 8C, an Al foil was used in all Comparative Example 2 and Reference Examples 2 and 3; however, in Comparative Example 2, only the reduction current was observed at approximately 1.4V lower potential than those in Reference Examples 2 and 3, in which a binder was not used. As the result, it was suggested that the PTFE binder was reduced and decomposed in Comparative Example 2.

REFERENCE SIGNS LIST

1 cathode layer
2 anode layer
3 electrolyte layer
4 cathode current collector
5 anode current collector
6 battery case
10 fluoride ion battery

What is claimed is:

1. A fluoride ion battery comprising a cathode layer, an anode layer, and an electrolyte layer formed between the cathode layer and the anode layer, wherein
the anode layer comprises an anode active material and a non-fluorine-based binder having aromaticity, and
the anode active material is configured to react with a fluoride ion.

2. The fluoride ion battery according to claim 1, wherein the non-fluorine-based-binder is polyimide resin.

3. The fluoride ion battery according to claim 2, wherein the anode active material is a simple substance of metal, an alloy, a metal oxide, or a fluoride thereof.

4. The fluoride ion battery according to claim 2, wherein the anode active material contains at least one metal element selected from the group consisting of La, Ca, Al, Eu, Li, Si, Ge, Sn, In, V, Cd, Cr, Fe, Zn, Ga, Ti, Nb, Mn, Yb, Zr, Sm, Ce, Mg, and Pb.

5. The fluoride ion battery according to claim 2, wherein the anode active material contains at least Fe element.

6. The fluoride ion battery according to claim 2, wherein the anode active material is a carbon material, a polymeric material, or a fluoride thereof.

7. The fluoride ion battery according to claim 1, wherein the anode active material is a simple substance of metal, an alloy, a metal oxide, or a fluoride thereof.

8. The fluoride ion battery according to claim 1, wherein the anode active material contains at least one metal element selected from the group consisting of La, Ca, Al, Eu, Li, Si, Ge, Sn, In, V, Cd, Cr, Fe, Zn, Ga, Ti, Nb, Mn, Yb, Zr, Sm, Ce, Mg, and Pb.

9. The fluoride ion battery according to claim 1, wherein the anode active material is a carbon material, a polymeric material, or a fluoride thereof.

\* \* \* \* \*